(12) United States Patent
Oga et al.

(10) Patent No.: US 7,399,922 B2
(45) Date of Patent: Jul. 15, 2008

(54) WIRING FIXING MEMBER

(75) Inventors: Tatsuya Oga, Shizuoka (JP); Akihito Tsukamoto, Toyota (JP); Masahiro Takamatsu, Toyota (JP); Koji Nomura, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/633,515

(22) Filed: Dec. 5, 2006

(65) Prior Publication Data
US 2007/0127193 A1    Jun. 7, 2007

(30) Foreign Application Priority Data
Dec. 5, 2005    (JP)    ............... 2005-350338

(51) Int. Cl.
*H02G 3/04* (2006.01)
(52) U.S. Cl. ............ 174/72 A; 174/135; 174/659; 248/73; 248/74.1
(58) Field of Classification Search ......... 174/71 R, 174/72 A, 72 C, 96–98, 99 R, 135, 101, 136, 174/40 CC, 650, 654, 655, 659, 660, 100, 174/74 R, DIG. 11; 138/173, 106, 108, 113, 138/121, 135, 162; 248/74.3, 56, 71, 73, 248/74.1
See application file for complete search history.

(56) References Cited

U.S. PATENT DOCUMENTS

| | | | | |
|---|---|---|---|---|
| 4,295,618 A | * | 10/1981 | Morota et al. | 248/73 |
| 4,681,288 A | * | 7/1987 | Nakamura | 248/71 |
| 5,390,876 A | * | 2/1995 | Hatano et al. | 248/73 |
| 6,294,736 B1 | * | 9/2001 | Takeda et al. | 174/72 A |
| 6,376,777 B1 | * | 4/2002 | Ito et al. | 174/152 G |
| 6,595,473 B2 | * | 7/2003 | Aoki et al. | 248/73 |
| 6,923,406 B2 | * | 8/2005 | Akizuki | 248/71 |
| 6,923,407 B2 | * | 8/2005 | Takeuchi | 248/73 |
| 6,935,598 B2 | * | 8/2005 | Sono et al. | 248/71 |
| 7,182,299 B2 | * | 2/2007 | Takeuchi | 248/71 |

FOREIGN PATENT DOCUMENTS

JP    6-71906 U    10/1994

* cited by examiner

*Primary Examiner*—Angel R Estrada
(74) *Attorney, Agent, or Firm*—Sughrue Mion, PLLC

(57) ABSTRACT

A wiring fixing member for fixing a receiving member, receiving wiring therein, to a mating member includes a base portion, a pair of holding walls which are formed on and project upwardly from the base portion, and can hold the receiving member therebetween in a manner to position the receiving member, and a pair of retaining portions which extend respectively from the pair of holding walls, and can retain the receiving member held by the pair of holding walls, the pair of retaining portions defining an opening therebetween which intersects a longitudinal direction of the receiving member, held by the pair of holding walls, at an acute angle.

4 Claims, 7 Drawing Sheets

WIRING FIXING MEMBER

BACKGROUND OF THE INVENTION

1. Field of the Invention

This invention relates to a wiring fixing member for fixing wiring to a mating member.

2. Related Art

Various electronic equipments are mounted on a mobile body such as an automobile. Therefore, wire harnesses are installed in the automobile so as to supply electric power from a power source or the like to the electronic equipments and also to transmit control signals from a computer or the like to the electronic equipments. The wire harness comprises a plurality of wires, and connectors secured to end portions of the wires.

The wire comprises an electrically-conductive conductor, and a sheath portion which is made of an insulative synthetic resin and covers the conductor. The wire is a so-called sheathed wire. The connector comprises electrically-conductive metal terminals, and an insulative connector housing. The metal terminal is secured to the end portion or other portion of the wire, and is electrically connected to the conductor of the wire. The connector housing is formed into a box-like shape, and receives the metal terminals.

One example of holding members for the wire harness is the type which holds the wire harness received in a generally cylindrical corrugated tube. Referring to this wire harness holding member, a plurality of grooves are formed in an outer periphery of the corrugated tube, and the plurality of grooves are arranged at equal intervals in a direction of an axis of the corrugated tube, and each groove is formed over an entire circumference of the corrugated tube. With this construction, the corrugated tube has a generally bellows-shape, and reduces damage applied from other parts to the wire harness.

The holding member has a generally cylindrical shape, and the corrugated tube is passed through the holding member, so that the wire harness is held by the holding member through the corrugated tube. A generally annular plate-like rib is formed within the holding member, and this rib is inserted in the groove of the corrugated tube, thereby preventing the axial movement of the corrugated tube relative to the holding member.

Biting projections are formed within the holding member, and the biting projections bite into the outer periphery of the corrugated tube, thereby preventing the rotation of the corrugated tube relative to the holding member.

Another conventional holding member for holding a wire-like member such as a wire harness is disclosed in JP-UM-A-6-71906 Publication. In this holding member, a pair of elastic holding walls which are open respectively in opposite directions are formed respectively on opposite end portions of an upper surface of a base plate, and a space larger than the diameter of the wire-like member is formed between the two elastic holding walls. With this construction, merely by turning the wire-like member through an angle of 90 degrees in normal and reverse directions on the base plate, the wire-like member can be quite easily mounted on and removed from the base plate.

Although the operations for mounting and removing the wire-like member relative to the base plate have been simplified by the use of the holding member of the above JP-UM-A-6-71906 Publication, there has been encountered a problem that the holding member increases in size when the wire-like member becomes thick with an increased number of the wires and for other reasons. Therefore, the holding member has been required to have a smaller design, and it has been necessary to eagerly study the possibility of such a small design.

SUMMARY OF THE INVENTION

With the above problems in view, it is an object of this invention to provide a wiring fixing member which can be formed into a small design.

The above object has been achieved by a wiring fixing member of the invention of claim 1 for fixing a receiving member, receiving wiring therein, to a mating member; including: a base portion, a pair of holding walls which project upwardly from the base portion to hold and position the receiving member therebetween, and a pair of retaining portions which extend respectively from the pair of holding walls to retain the receiving member held by the pair of holding walls, the pair of retaining portions defining an opening therebetween which intersects a longitudinal direction of the receiving member, held by the pair of holding walls, at an acute angle.

In the wiring fixing member according to first aspect of the invention, when the receiving member is passed through the opening formed by the pair of retaining portions and intersecting the longitudinal direction of the receiving member at the acute angle, and then is turned or angularly moved, the receiving member is held by the pair of holding walls in such a manner that the receiving member is positioned in the longitudinal direction, and at the same time the receiving member is retained by the pair of retaining portions.

The wiring fixing member according to second aspect of the invention, is characterized in that the wiring fixing member further includes fixing portions which are continuous with the holding walls, respectively, and the fixing portions can be fixed to the mating member in such a manner that the mating member closes the opening formed by the retaining portions.

In the wiring fixing member according to the second aspect of the invention, after the receiving member is held by the pair of holding walls in such a manner that the receiving member is positioned in the longitudinal direction, and also the receiving member is retained by the pair of retaining portions, the wiring fixing member can be fixed to the mating member through the fixing portions in such a manner that the mating member closes the opening.

The wiring fixing member according to third aspect of the invention, is characterized in that the fixing portions are continuous respectively with the retaining portions extending respectively from upper end portions of the holding walls, and respectively form flat surfaces for abutting against the mating member.

With this construction, the wiring fixing member according to third aspect of the invention can be fixed to the mating member, with the fixing portions and the retaining portions held against the mating member.

The wring fixing member according to fourth aspect of the invention, is characterized in that the wiring fixing member has an engagement portion which can be engaged with a bellows portion of the receiving member.

In the wiring fixing member according to the fourth aspect of the invention, when the receiving member is held by the pair of holding walls in such a manner that the receiving member is positioned in the longitudinal direction, and also the receiving member is retained by the pair of retaining portions, the engagement portion is engaged with the bellows portion of the receiving member.

As described above, in the wiring fixing member according to the first aspect of the invention, when the receiving member is passed through the opening formed by the pair of retaining portions and intersecting the longitudinal direction of the receiving member at the acute angle, and then is turned or angularly moved, the receiving member is held by the pair of holding walls in such a manner that the receiving member is positioned in the longitudinal direction, and at the same time the receiving member is retained by the pair of retaining portions. Therefore, as compared with a construction in which the receiving member is passed through an opening extending in a direction perpendicular to the longitudinal direction of the receiving member, the distance between the pair of holding walls in the longitudinal direction can be made smaller so as to achieve the smaller design. And besides, the mounting of the wiring fixing member on the receiving member can be effected in one direction, and therefore this mounting operation can be carried out, using a machine.

In the second aspect of the invention, in addition to the advantages of the first aspect of the invention, after the receiving member is held by the pair of holding walls in such a manner that the receiving member is positioned in the longitudinal direction, and also the receiving member is retained by the pair of retaining portions, the wiring fixing member can be fixed to the mating member through the fixing portions in such a manner that the mating member closes the opening. Therefore, the opening is closed by the mating member, thereby preventing the receiving member from disengagement from the wiring fixing member.

In the third aspect of the invention, in addition to the advantages of the first and second aspects of the invention, the wiring fixing member can be fixed to the mating member, with the fixing portions and the retaining portions held against the mating member. Therefore, the opening is positively closed by the mating member, thereby preventing the receiving member from disengagement from the wiring fixing member.

In the fourth aspect of the invention, in addition to the advantages of the first through third aspects of the invention, when the receiving member is held by the pair of holding walls in such a manner that the receiving member is positioned in the longitudinal direction, and also the receiving member is retained by the pair of retaining portions, the engagement portion is engaged with the bellows portion of the receiving member. Therefore, the withdrawal of the receiving member is prevented, so that a sufficient retaining force can be obtained.

DETAILED DESCRIPTION OF THE PREFERRED EMBODIMENTS

Figure 1:
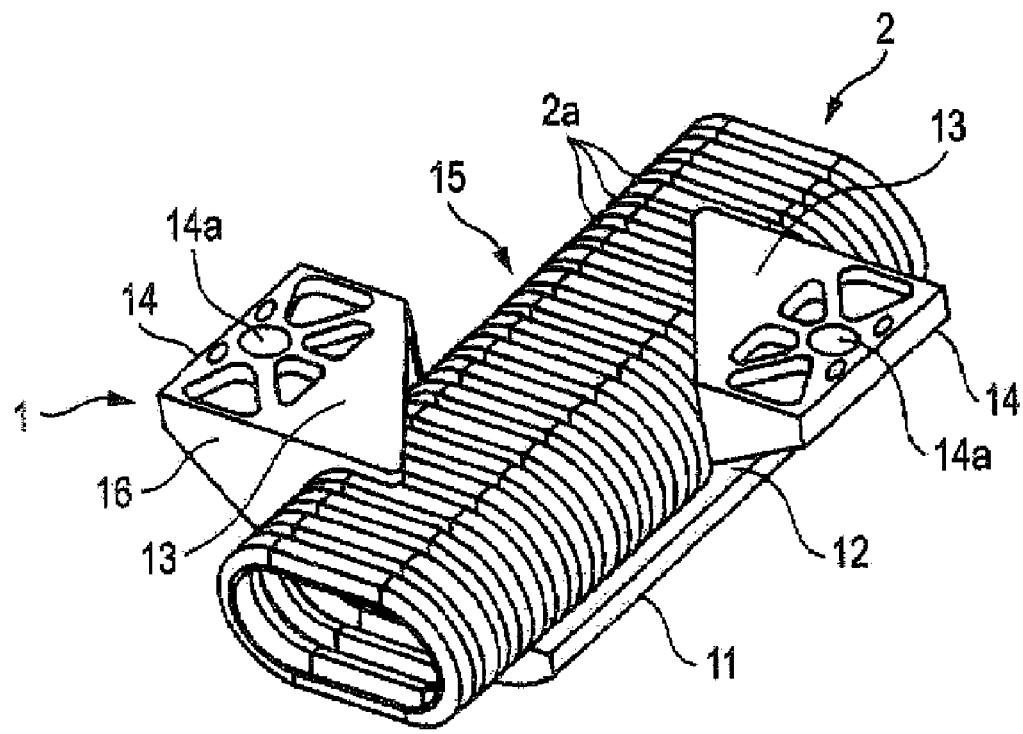
FIG. 1 is a perspective view showing a condition in which a wiring fixing member of the present invention holds a receiving member.
Figure 2:
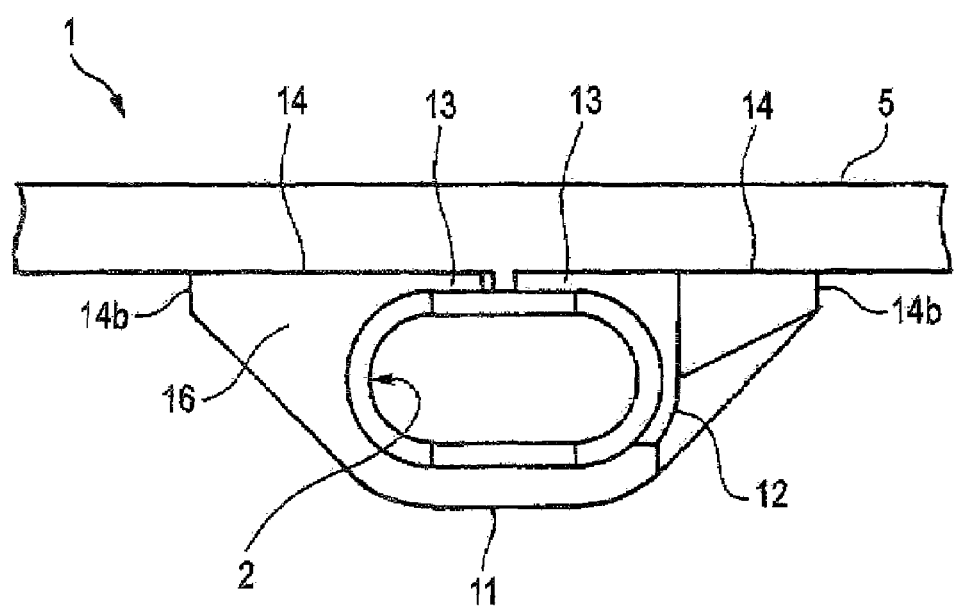
FIG. 2 is a view explanatory of a condition in which a wiring holding unit of the invention is fixed to a mating member.
Figure 3:
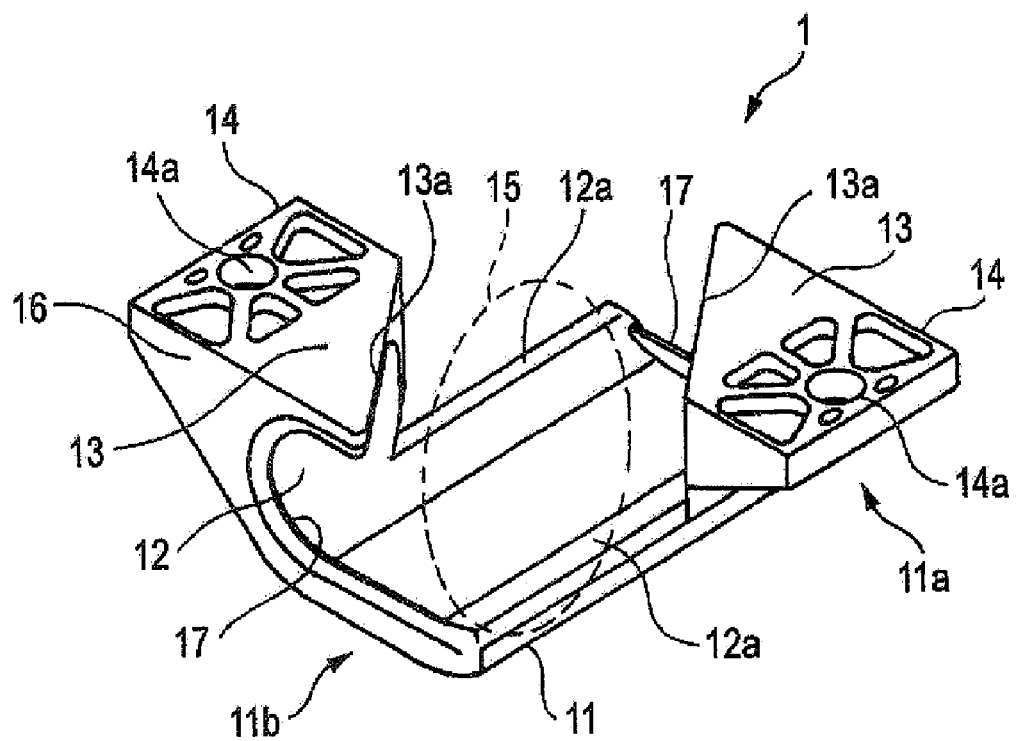
FIG. 3 is a perspective view of the wiring fixing member of FIG. 1 which does not hold the receiving member.
Figure 4:
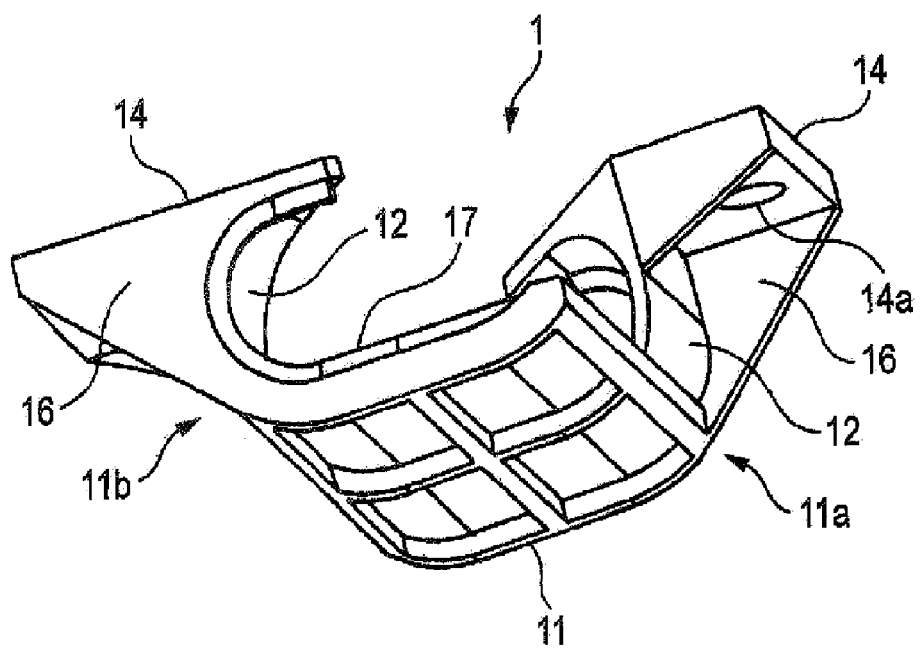
FIG. 4 is a perspective view of the wiring fixing member of FIG. 3 as seen from the lower side thereof.

One preferred embodiment of a wiring fixing member of the present invention will now be described with reference to FIGS. 1 to 7.

In FIGS. 1 to 7, the wiring fixing member 1 is designed to fix a corrugated tube (receiving member) 2 of a generally oval tubular shape (in which wire harnesses (not shown) serving as wiring are received) to a mating member 5 such as a vehicle body, a panel or other part of a vehicle. The wiring fixing member 1 includes a base portion 11, a pair of holding walls 12 and 12, retaining portions 13 formed respectively at the holding walls 12, fixing portions 14 continuous respectively with the holding walls 12, reinforcing portions 16, and engagement portions 17. These portions are formed integrally with each other, using a synthetic resin or the like.

As described above, the wire harness comprises a plurality of wires, and connectors secured to end portions of the wires. However, any other suitable type such as one or a plurality of wires or a cable can be used as the wiring.

The corrugated tube 2 is made of a synthetic resin or the like, and is formed into a generally oval tubular shape. The plurality of wire harnesses (serving as the wiring) are passed through and received in the interior of the corrugated tube 2. A plurality of grooves (recesses) 2a each having a square cross-section are formed in an outer peripheral surface of the corrugated tube 2, and the plurality of grooves 2a are arranged at equal intervals in a direction of an axis of the corrugated tube 2, and each groove 2a is formed over an entire circumference of the corrugated tube 2. With this construction, the corrugated tube 2 has a generally bellows-shape, and reduces damage applied from other parts to the wire harness.

The base portion 11 has a rectangular plate-like shape, and extends long in the longitudinal direction of the corrugated tube 2. A width of the base portion 11 is generally equal to a width of the corrugated tube 2. A length of the base portion 11 in the longitudinal direction corresponds to the sum of lengths of the two holding walls 12 described later.

One of the two holding walls 12 extends upwardly from one side edge 11a of the base portion 11, while the other holding wall 12 extends upwardly from the other side edge 11b of the base portion 11. The pair of holding walls 12 and 12 are arranged in a stagger manner in the longitudinal direction of the base portion 1. Each holding wall 12 is in the form of a generally arc-shaped plate with a uniform thickness which corresponds in shape to the corrugated tube 2.

Each of the holding walls 12 has an extension portion 12a extending in the longitudinal direction of the base portion 11 and projecting upwardly from the side edge portion of the base portion 11. The extension portion 12a is lower in height than the holding wall 12. The extension portions 12a assist in positioning the corrugated tube 2.

The retaining portions 13 extend respectively from upper end portions of the holding walls 12 and 12, and retain the corrugated tube 2 held by the pair of holding walls 12 and 12. The pair of retaining portions 13 define an opening 15 therebetween which intersects the longitudinal direction (or longitudinal axis) of the corrugated tube 2, held by the pair of holding walls 12 and 12, at an acute angle.

Each of the retaining portions 13 has a triangular plate-like shape, and one side (or edge) 13a of the triangular retaining portion 13 intersects the longitudinal direction of the corrugated tube 2 such that the opening 15 is formed between the opposed sides 13a and 13a of the two retaining portions 13. Therefore, by changing the angle of each retaining portion 13, the acute angle of intersection of the one side 13a relative to the longitudinal direction of the corrugated tube 2 can be changed. The distance between the opposed sides 13a of the two retaining portions 13 is generally equal to the width of the corrugated tube 2 so that the corrugated tube 2 can be passed through the opening 15. Namely, the opening 15 functions as a passage hole for the corrugated tube 2.

The fixing portions 14 are formed in continuous relation to the holding walls 12 and 12, respectively, and are arranged such that when the fixing portions 14 are fixed to the mating member 5, the opening 15 formed by the retaining portions 13 is closed by the mating member 5. An insertion hole 14a is formed in each fixing portion 14, and is disposed in the vicinity of a central portion thereof. Bolts (not shown) projecting from the surface of the mating member 5 can be passed respectively through the insertion holes 14a for positioning purposes. Although each fixing portion 14 has a rectangular plate-like shape, it can have any other suitable shape such for example as a semi-circular plate-like shape.

Each reinforcing portion 16 serves to increase the strength of the corresponding fixing portion 14, and has a plate-like shape to cover a region surrounded by a straight line extending from an end 14b of the fixing portion 14 toward the base portion 11, the holding wall 12, the retaining portion 13 and the fixing portion 14. In case the strength of each fixing portion 14 can be made sufficiently high, for example, by increasing the thickness thereof, the provision of the reinforcing portions 16 may be omitted.

Each engagement portion 17 is formed on and projects upwardly from the inner surface of the base portion 11 (which is to be opposed to the corrugated tube 2), and also extends from the reinforcing portion 16 such that the engagement portion 17 can be engaged in an arbitrary one of the grooves (bellows portion) 2a of the corrugated tube 2. Namely, the engagement portion 17 is in the form of a generally J-shaped plate, and is formed to extend along an end edge of the base portion 11 to the reinforcing portion 16. The engagement portions 17 are so formed as to be directed toward the corrugated tube 2 which is to be held by the holding walls 12, and the engagement portions 17 are fitted respectively in two grooves 2a of the corrugated tube 2 held by the pair of holding walls 12 and retained by the pair of retaining portions 13, thereby preventing the corrugated tube 2 from withdrawal from the wiring fixing member 1.

Next, a method of mounting the above wiring fixing member 1 on the corrugated tube 2, as well as an operation thereof, will be described.

Figure 5:
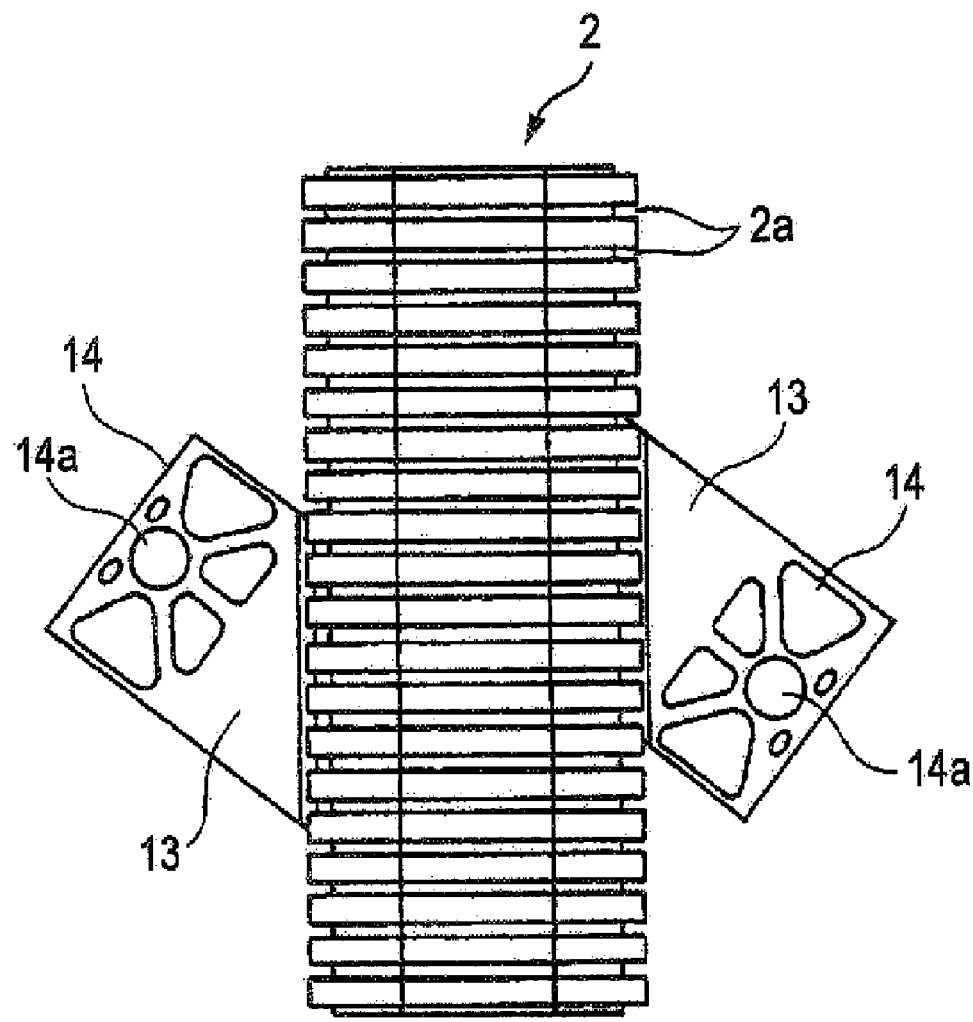
FIG. 5 is a top plan view showing a condition immediately before the wiring fixing member is mounted on the receiving member.
Figure 6:
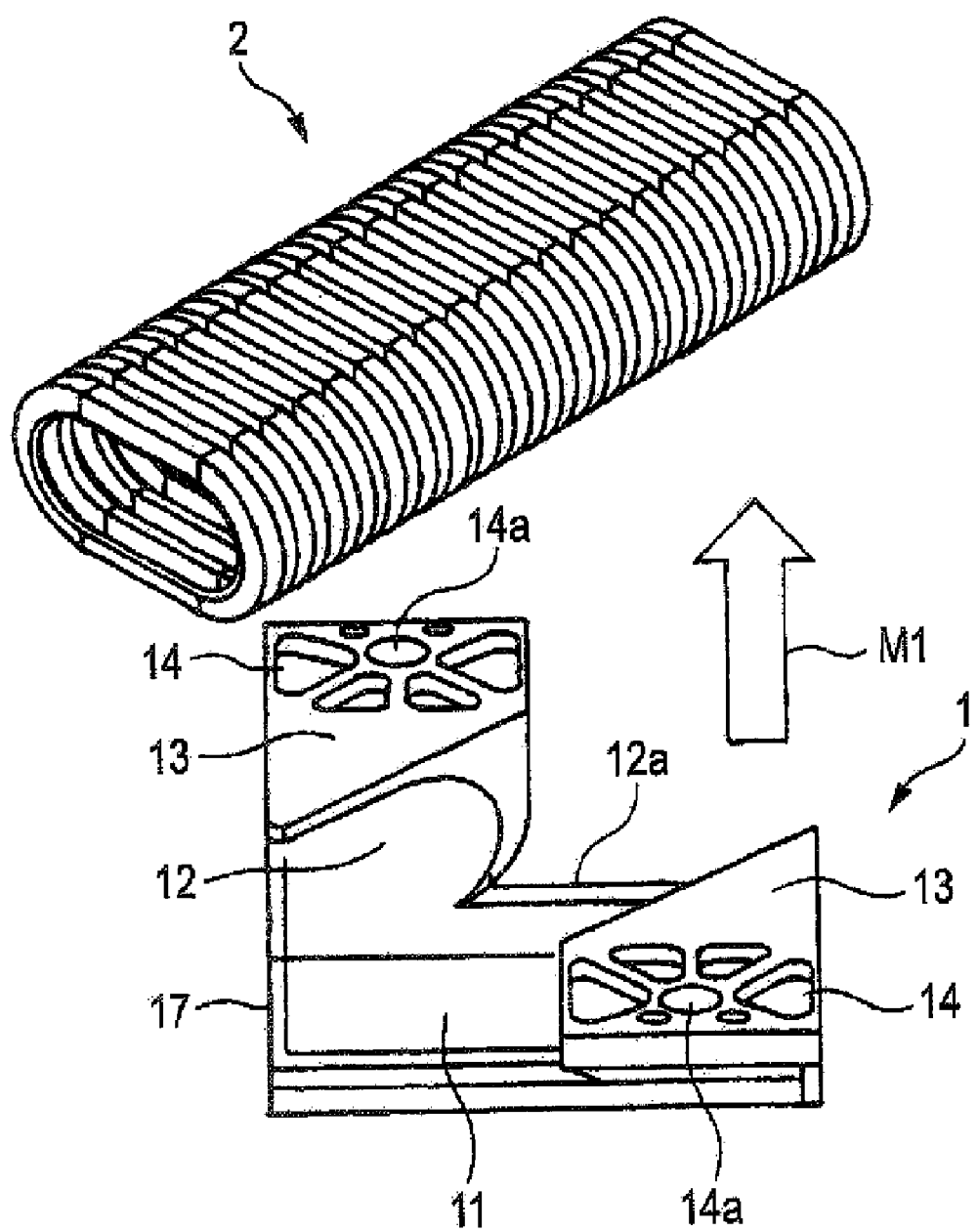
FIG. 6 is a perspective view showing the condition immediately before the wiring fixing member is mounted on the receiving member.
Figure 7:
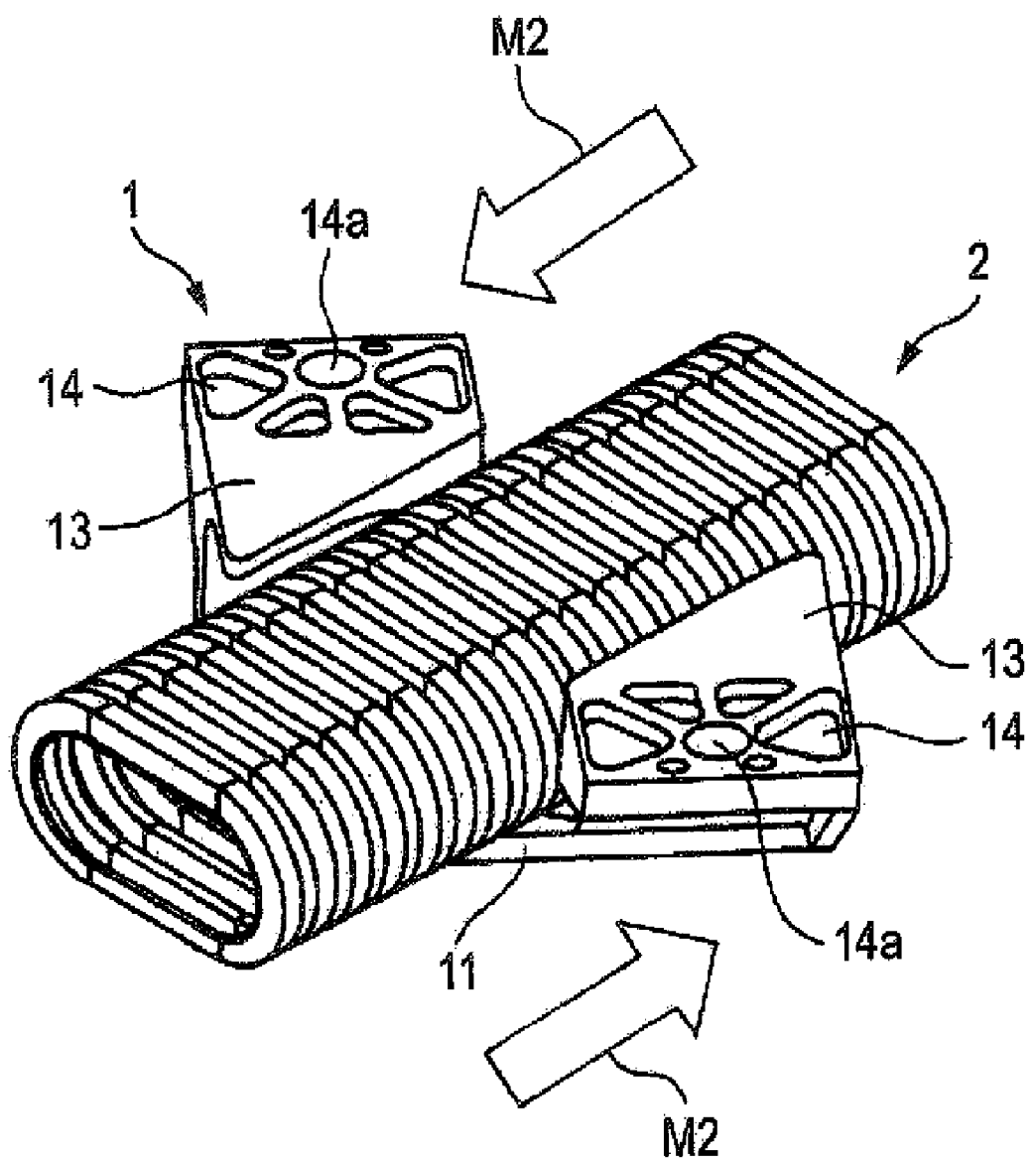
FIG. 7 is a perspective view showing a condition in which the wiring fixing member is fitted on the receiving member.

As shown in FIGS. 5 and 6, the wiring fixing member 1 is located below the corrugated tube 2 so that the corrugated tube 2 can be passed through the opening 15. Then, the wiring fixing member 1 is moved in a mounting direction M1 at the lower side of the corrugated tube 2, and the corrugated tube 2 completely passes through the opening 15, and then abuts against the base portion 11 as shown in FIG. 7. In this embodiment, the wiring fixing member 1 is moved toward the corrugated tube 2, and is mounted thereon. However, when mounting the wiring fixing member 1 on the corrugated tube 2, the corrugated tube 2 can be moved toward the wiring fixing member 1.

When the wiring fixing member 1 is turned or angularly moved in a direction M2, the pair of holding walls 12 and 12 abut against the corrugated tube 2, thereby positioning and holding the corrugated tube 2, and at the same time the retaining portions 13 abut against the surface of the corrugated tube 2, thereby retaining the corrugated tube 2 held by the pair of holding walls 12 and 12.

In this condition, the retaining portions 13 and the fixing portions 14 are brought into abutting engagement with the mating member 5, while passing the bolts of the mating member 5 respectively through the insertion holes 14a of the fixing portions 14, and nuts (not shown) are threaded respectively on the bolts to fasten the fixing portions 14, thereby fixing the wiring fixing member 1 to the mating member 5.

In this embodiment, although the mounting operation is carried out using the corrugated tube 2 through which the wire harnesses are not yet passed, the invention is not limited to this method, and the mounting operation can be effected in a condition in which the wire harnesses are passed through the corrugated tube 2.

As described above, in the wiring fixing member 1 of the invention, when the corrugated tube 2 is passed through the opening 15 formed by the pair of retaining portions 13 and 13 and intersecting the longitudinal direction of the corrugated tube 2 at the acute angle, and then is turned or angular moved, the corrugated tube 2 is held by the pair of holding walls 12 and 12 in such a manner that the corrugated tube 2 is positioned in the longitudinal direction, and at the same time the corrugated tube 2 is retained by the pair of retaining portions 13 and 13. Therefore, as compared with the conventional construction in which the corrugated tube 2 is passed through an opening extending in a direction perpendicular to the longitudinal direction of the corrugated tube 2, the distance between the pair of holding walls 12 and 12 in the longitudinal direction can be made smaller so as to achieve the smaller design. And besides, the mounting of the wiring fixing member 1 on the corrugated tube 2 can be effected in one direction, and therefore this mounting operation can be carried out, using a machine.

Furthermore, after the corrugated tube 2 is held by the pair of holding walls 12 and 12 in such a manner that the corrugated tube 2 is positioned in the longitudinal direction, and also the corrugated tube 2 is retained by the pair of retaining portions 13 and 13, the wiring fixing member 1 can be fixed to the mating member 5 through the fixing portions 14 in such a manner that the opening 15 is closed by the mating member 5. Thus, the opening 15 is closed by the mating member 5, thereby preventing the corrugated tube 2 from disengagement from the wiring fixing member 1.

Furthermore, the wiring fixing member 1 can be fixed to the mating member 5, with the fixing portions 14 and the retaining portions 13 held against the mating member 5. Therefore, the opening 15 is positively closed by the mating member 5, thereby preventing the corrugated tube 2 from disengagement from the wiring fixing member.

Furthermore, when the corrugated tube 2 is held by the pair of holding walls 12 and 12 in such a manner that the corrugated tube 2 is positioned in the longitudinal direction, and also the corrugated tube 2 is retained by the pair of retaining portions 13 and 13, the engagement portions 17 are engaged respectively in the grooves 2a of the corrugated tube 2, and therefore the withdrawal of the corrugated tube 2 is prevented, and the sufficient retaining force is obtained.

In the above embodiment, although the corrugated tube 2 is used as the receiving member, any other suitable form can be used, and for example, a sheath member of a wire harness (wiring) can be used as a receiving member, in which case the use of the corrugated tube 2 is omitted.

What is claimed is:

1. A wiring fixing member for fixing a receiving member, receiving wiring therein, to a mating member, comprising:
   a base portion;
   a pair of holding walls which project upwardly from said base portion to hold and position said receiving member therebetween; and
   a pair of retaining portions which extend respectively from said pair of holding walls to retain said receiving member held by said pair of holding walls, said pair of retaining portions defining an opening therebetween having a centerline equidistant from said retaining portions, said centerline intersecting a longitudinal direction of said receiving member, held by said pair of holding walls, at an acute angle.

2. A wiring fixing member according to claim 1, wherein said wiring fixing member further includes fixing portions which are continuous with said holding walls, respectively, and said fixing portions can be fixed to said mating member such that said mating member closes said opening formed by said retaining portions.

3. A wiring fixing member according to claim 2, wherein said fixing portions are continuous respectively with said retaining portions extending respectively from upper end portions of said holding walls, and respectively form flat surfaces for abutting against said mating member.

4. A wring fixing member according to claim 1, wherein said wiring fixing member has an engagement portion which can be engaged with a bellows portion of said receiving member.

* * * * *